(No Model.)
A. L. ADAMS.
IMPLEMENT HANDLE.
No. 604,105. Patented May 17, 1898.
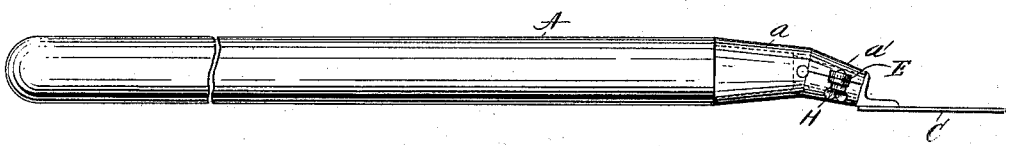
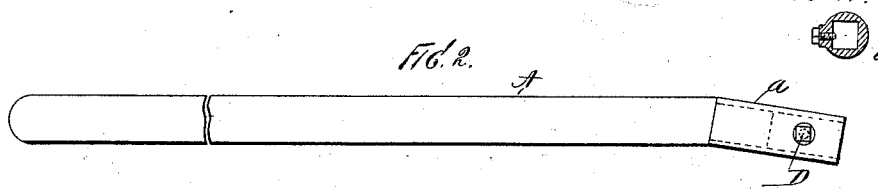
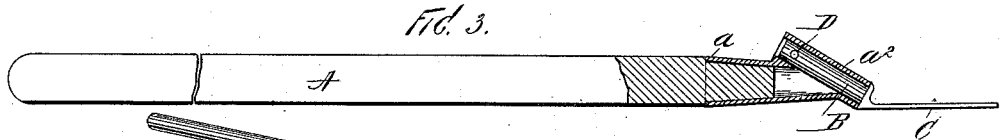
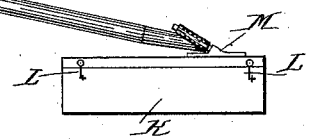
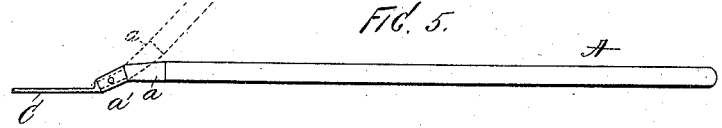
WITNESSES:
John Buckler,
L. M. Muller.
INVENTOR
Abraham L. Adams,
BY
Edgar Tate & Co
ATTORNEYS.

United States Patent Office.

ABRAHAM LINCOLN ADAMS, OF BRIDGEPORT, CONNECTICUT, ASSIGNOR OF ONE-HALF TO GEORGE E. HAWES, OF SAME PLACE.

IMPLEMENT-HANDLE.

SPECIFICATION forming part of Letters Patent No. 604,105, dated May 17, 1898.

Application filed July 30, 1895. Serial No. 557,619. (No model.)

*To all whom it may concern:*

Be it known that I, ABRAHAM LINCOLN ADAMS, a citizen of the United States, and a resident of Bridgeport, in the county of Fairfield and State of Connecticut, have invented certain new and useful Improvements in Implement-Handles, of which the following is a specification, reference being had to the accompanying drawings, forming a part thereof, in which similar letters of reference indicate corresponding parts.

This invention relates to handles for implements of various kinds and classes; and the object thereof is to provide what is known as a "universal implement holder or handle," which comprises a handle having a tubular head connected therewith or adapted to be connected therewith, which is adapted to receive or support a hoe, a spade, a rake, a pick, or any other implement or tool at an angle thereto and in any desired lateral position with reference to the handle, such implement or tool being provided with a shaft adapted to be inserted into and secured within said tubular head and to be turned therein; and with this and other objects in view the invention consists in the construction, combination, and arrangement of parts hereinafter described and claimed.

The invention is fully disclosed in the following specification, of which the accompanying drawings form a part, in which—

Figure 1 is a side elevation showing one form of my improvement; Fig. 2, a side elevation showing a modification; Fig. 3, a sectional side elevation showing a third form or modification; Fig. 4, a view showing in side elevation a box or chest in which implements of various kinds may be placed and which may be connected with my improved handle in the same manner as any other implement or tool. Fig. 5 shows in full and dotted lines the different positions in which a tool or implement may be held by my improved handle, and Fig. 6 shows a modified form of holder by which an implement may be connected with the handle.

In the practice of my invention I employ a handle A, which may be straight, as shown in Fig. 1, and provided with a curved tubular head or holder $a$, or which may be provided with an inclined shank, as shown in Fig. 2, and provided with a straight tubular head $a$.

It will be understood, of course, that if the straight handle is employed the head $a$ must have an inclined projection, as shown at $a'$, Fig. 1, and I may also employ a straight handle and a holder similar to that shown in Fig. 3, which is provided with an inclined portion $a'$ of the head $a$, as shown in Fig. 1. It will be observed that in each of these constructions the inclined portion of the head is substantially the same and the inclined portion of the head is designed to receive the shank B of a tool C, and this tool C may be either a hoe, a spade, a rake, a pick, a border-knife, or any other desired kind or class of implement.

I prefer to hold the shaft of the tool or implement in that portion of the head in which it is placed by means of a set-screw D, which will securely hold it in place and prevent it from turning or slipping, and it will also be observed that by reason of this construction the tool may be turned to any desired lateral position with reference to the handle, one of these changes in position being illustrated in Fig. 5, and in the construction shown in Figs. 1 and 3 the tool or implement herein shown may be set so as to be almost parallel with the handle, as will be readily understood, and by loosening the set-screw and turning the same it may be secured in a position almost at right angles thereto, as with an ordinary hoe. By means of this arrangement the same implement or tool may be used as a hoe or as a border-knife or a shuffle-hoe, and it will be observed that there is practically no limit to the character of the implement or tool that may be used in connection with my improved handle.

I may, if preferred or when desired, form the head-piece which receives the shaft of the tool and the inner walls thereof square or many sided, as shown in Fig. 6, in which event the shaft of the tool or implement may also be similarly formed, and it will be observed that by reason of this construction a result similar to that hereinbefore described may be produced; but I prefer the construction hereinbefore described, in which the said parts are tubular in form and by means of which the implement or tool may be revolved in the holder without being removed therefrom, the set-screw at all times constituting a secure fastening device.

Another feature of the construction is shown in Fig. 1, in which that portion $a'$ of the head which receives the shank of the tool or implement is divided longitudinally and provided with shoulders E, through which is passed a set-screw H, by means of which the parts may be caused to clamp and securely hold the shaft of the tool or implement.

The head $a$ may be secured to the handle A in any desired manner, and it will thus be seen that I accomplish the object of my invention by means of a device which is simple in construction and operation and which constitutes, as hereinbefore stated, a universal implement-holder and one which is comparatively inexpensive and fully adapted to accomplish the result for which it is intended.

In Fig. 4 I have shown a box or chest K, provided with a hinged cover and fastening devices L, and secured to the top or cover of this box or chest is a plate M, provided with a shaft which is also adapted to enter the inclined portion $a^2$ of the holder $a$, and, as will be observed, the handle A may be connected with this box or implement and to which it may be readily secured in the same manner as hereinafter described. The box or chest K is intended as a receptacle for any or all of the tools or implements which it may be desired to use in connection with my improved handle, and it will readily be seen that by reason of this arrangement the said box or receptacle may be carried from one point to another and that the handle A will constitute a ready device for this purpose.

By my invention I provide a handle for tools of any desired character, class, or kind, and, further, I also provide means for holding such tool or implement in any desired position with relation to the handle and at any desired angle thereto, and it is apparent that changes in and modifications of the construction described may be made without departing from the spirit of my invention or sacrificing its advantages, and I therefore reserve the right to make all such alterations thereof as fairly come within the scope of the invention.

Having fully described my invention, I claim and desire to secure by Letters Patent—

In a tool, the combination with a handle provided with a ferrule bent at an angle thereto, said ferrule having a longitudinal perforation, adapted to engage a plurality of tools each having a shank secured thereto adapted to enter the perforation of the ferrule and rotate therein, the angle of attachment of each shank to its tool being such that in the rotation of the tool the tool will lie at a constantly-varying angle to the handle.

In testimony that I claim the foregoing as my invention I have signed my name, in presence of the subscribing witnesses, this 26th day of July, 1895.

ABRAHAM LINCOLN ADAMS.

Witnesses:
GEORGE ERSKIN HAWES,
S. C. NORTHROP.